(No Model.)
H. C. BRADEEN.
MANUFACTURE OF TUBING.
No. 368,059. Patented Aug. 9, 1887.
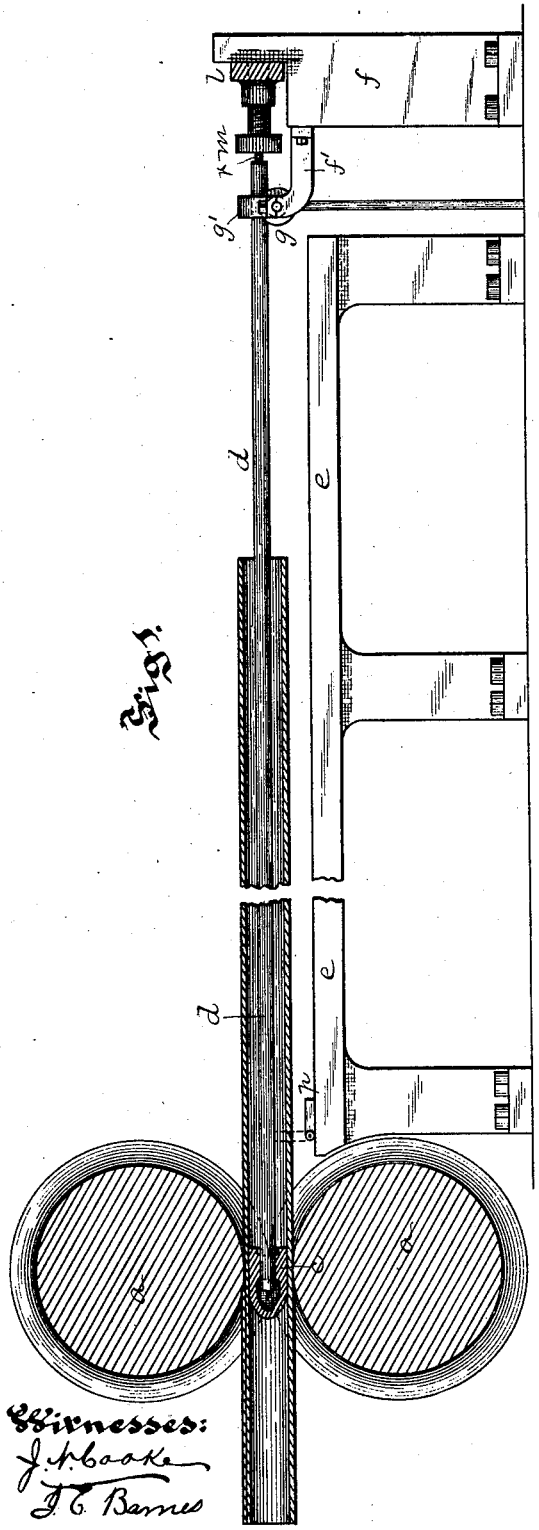
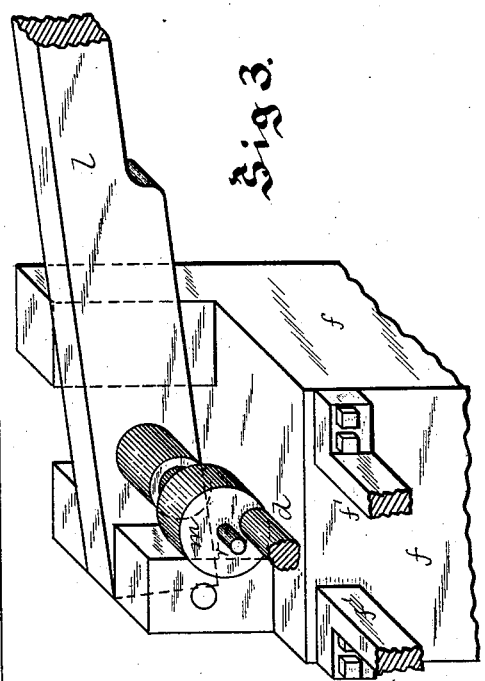
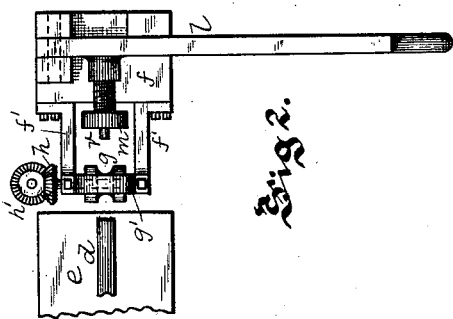
Witnesses:
J. N. Cooke
J. C. Barnes
Inventor.
Hiram C. Bradeen
By James J. Ray
Attorney

UNITED STATES PATENT OFFICE.

HIRAM C. BRADEEN, OF McKEESPORT, PENNSYLVANIA, ASSIGNOR TO THE NATIONAL TUBE WORKS COMPANY, OF BOSTON, MASSACHUSETTS.

MANUFACTURE OF TUBING.

SPECIFICATION forming part of Letters Patent No. 368,059, dated August 9, 1887.

Application filed November 23, 1886. Serial No. 219,562. (No model.)

*To all whom it may concern:*

Be it known that I, HIRAM C. BRADEEN, of McKeesport, in the county of Allegheny and State of Pennsylvania, have invented a new and useful Improvement in the Manufacture of Tubing; and I do hereby declare the following to be a full, clear, and exact description thereof.

My invention relates to the manufacture of lap-weld tubing, this tubing being formed from plate metal, the edges of the plate being scarfed and the plate bent up into tubular form with the scarfed edges extending past each other, forming what is termed a "skelp," and after the formation of this skelp being placed within the tube-welding furnace and brought to a welding heat, and then pushed from the furnace and over a suitable guide-trough to the welding-rolls, which consist of two concave rolls and a welding-ball supported between them, the welding-ball forming the anvil on which the tubing is pressed by the rolls in welding together the overlapping scarfed or beveled edges thereof. The welding ball or mandrel is supported between the welding-rolls by means of a bar which extends back to a suitable stand termed a "snubbing-post," and rests against a lever thereon termed the "snubbing-post lever," and in making tubing the pressure against this welding-ball is sustained by the supporting-rod and snubbing-post. In making this tubing it often occurs that the welding-ball sticks within the skelp or partly-welded tube, so that the pressure and movement of the rolls is not sufficient to draw it over the ball, and the heated tubing shrinks or contracts quickly around the ball, forming what is termed a "sticker," and when the skelp or tube sticks thus around the ball, it is necessary to remove it from between the rolls and to either break the ball lodged within the tube or skelp or reheat the tube and feed it again to the welding-rolls, and by means of a second welding-ball push out the ball previously stuck within the tube. It is evident that both these operations are expensive, and that in breaking the ball within the tube the plate metal is necessarily expanded and thinned under the strokes of the hammer, so weakening the metal of the plate and in some cases preventing the formation of perfect tubing therefrom.

The object of my invention is to overcome the sticking of the skelp or tube around the welding-ball, and so prevent the loss of time necessary to remove the pipe from the rolls, as well as the cost of reheating and rolling or breaking out the welding-ball, it being evident that by preventing the formation of stickers a large saving in the manufacture of tubing is obtained.

To these ends my invention consists in imparting a jar to the welding ball or mandrel, which will cause the skelp to start again and thus overcome its sticking around the ball and cause it to be welded by the rolls without the necessity of withdrawing it therefrom. In imparting the jar to the welding-ball and supporting-rod, I prefer to impart a longitudinal jar, so, by causing the ball to change its position in relation to the welding-roll, enabling the rolls to obtain a further hold upon the skelp or tubing and to feed forward the skelp, and preventing the sticking thereof around the ball.

My invention further consists in the apparatus employed for imparting this jar to the supporting-rod, consisting in providing the snubbing-post or the lever thereon which sustains the supporting-rod with a pin, against which the end of the supporting-rod presses and which sustains the rod during its ordinary operation, but when the skelp sticks can be drawn out of line with the supporting-rod, and thus permit the rod to move back and strike against the stop-plate of the lever or other projection, so imparting the jar to the ball.

To enable others skilled in the art to practice my invention, I will describe the same more fully, referring to the accompanying drawings, in which Figures 1 and 2 are views of the tube-welding rolls supporting a rod and snubbing-post illustrating my invention, and Fig. 3 is an enlarged detail view of parts of the supporting-rod and the snubbing-post further illustrating the same.

Like letters of reference indicate like parts in each.

The tube-welding rolls $a$ are mounted in suitable bearings at the end of the welding-furnace, and the welding ball or mandrel c is supported between these rolls on the supporting-rod d, this rod being made of greater length than the tube to be welded and extending over the bed e, on which the tube rests, when the rod is withdrawn therefrom. The snubbing-post f is provided with the bracket f', carrying the friction-roller g, having a concave groove therein, in which the supporting-rod d rests, a suitable cover-plate, g', being secured to the bracket f' and extending over the roll g, so as to hold the supporting-rod within the groove thereof. This friction-roller g is operated by any suitable mechanism to advance and retract the supporting-rod, that shown in the drawings being a bevel-gear, h, secured on the shaft of the roller g and meshing within a bevel-gear, h', mounted on a vertical shaft, to which power is applied and by means of which the roller g is rotated. The snubbing-post f has pivoted at one side thereof the lever l, this lever extending across the course of the supporting-rod and having thereon the stop-plate m, the stop-plate being mounted on a suitable threaded shaft, which screws into and out of the lever, so as to adjust the welding-ball on the supporting-rod d to the proper length and position within the welding-rolls. When the supporting-rod is to be withdrawn, the lever is raised out of its course, and the friction-roller g thereon draws back the rod, the rod passing across the snubbing-post; and when it is advanced the friction thereon forces the rod forward until the welding-ball is brought between the rolls, the lever being lowered across the course of the rod and the end of the lever pressing against the stop-plate m, the rod being thus supported against the back-pressure on the welding-ball during the welding operation. A suitable pivoted supporting-lug, p, is generally employed at the forward end of the bed-plate e to support the forward end of the rod d until the tube being welded strikes against this lug and causes it to drop out of its course.

This apparatus, as above described, is that ordinarily employed in the manufacture of lap-weld tubing, and in order to arrange for the imparting of the jar to the welding-ball and supporting-rod, I provide the stop-plate l with a pin, r, which extends out a short distance from the snubbing-post lever, and which acts as a support to the rod d during the ordinary welding operation, the supporting-rod pressing against this pin r, instead of against the body of the stop-plate m, as in the ordinary apparatus.

When a tube is to be welded, the skelp heated in the welding-furnace is pushed by the welders through the end of the furnace and directed to the welding-rolls, which engage with the same and compress it around the welding-ball c, thus welding together the overlapping edges of the skelp, the rolls drawing upon the skelp and feeding it over the welding-ball; and the pressure on the welding-ball and rod is sustained during this operation by the pin r on the stop-plate of the snubbing-post lever, the welding operation being the same as in the ordinary method of making tubing, except that the back-pressure of the supporting-rod is sustained by this pin instead of by the body of the stop-plate. As soon as the welding operation is completed, the stop-plate is raised, and by means of the roller g the rod d is drawn backward, the welding-ball striking against the rear end of the skelp and being knocked from the supporting-rod, and the rod withdrawn from the tube, which then drops on the bed e and is removed and finished in the ordinary manner. In case, however, the skelp or partially-welded tube should stick within the rolls and bind around the welding-ball, as soon as this occurs the operator simply raises the snubbing-post lever until the pin r is drawn out of line with the supporting-rod, when, the rod being unsupported, the pressure thereon will force it back quickly until it strikes against the stop-plate m, when its movement is suddenly checked and a jar is imparted to the welding-ball at the forward end of the rod, and it is found that this jar, by imparting a like jar to the skelp or partially-welded tube, frees the same from the welding-ball and causes it to travel over the same, and by presenting fresh faces of the tube or skelp to the welding-rolls enables them to bite more firmly thereon and force the skelp over the ball, and in most cases prevents the sticking of the skelp around the ball, thus overcoming this very great difficulty in the manufacture of lap welded tubing.

In the most approved form of welding-balls the ball tapers slightly from the point of greatest diameter backward toward its rear end, being of slightly greater diameter in front of its welding-point than at the point where the metal of the tube is compressed between the rolls and the ball, this construction being employed to open the skelp slightly and feed it properly to the rolls for welding. When the jar is imparted to the ball, as above described, and the ball moves backward a short distance within the rolls, it brings this point of greater diameter to the point at which the metal is compressed between the rolls and ball, and by pressing the skelp against the rolls more firmly gives them a greater bite or frictional pressure upon the metal of the skelp, and so enables them to force the skelp over the ball.

This jar may be imparted to the welding-ball and its rod by any suitable apparatus, that shown and described by me being considered the simplest and most effective means of carrying out my invention. By my invention I am enabled to overcome the sticking of these skelps in the manufacture of this wrought-metal tubing in almost all cases, and by doing so I overcome one of the greatest difficulties found in the manufacture of this tubing, and I save the cost of breaking out the welding-ball from the unfinished tube and reheating the tube, as well as preventing injury to the tube by the hammering thereon in breaking out the ball sticking therein and in reheating the tube for the second welding operation.

The apparatus employed can be applied to all welding-benches at a nominal cost and requires no skill in operating it, all that is necessary being to secure to the stop-plate of the snubbing-post lever this short pin, and when the skelp or partly-welded tube sticks around the welding-ball to raise the tube slightly until the pin is drawn out of line with the supporting-rod.

What I claim as my invention, and desire to secure by Letters Patent, is—

1. The herein-described method of overcoming the sticking of skelp or tubing in the manufacture of wrought-metal tubing, consisting in imparting a jar to the welding ball or mandrel, substantially as and for the purposes set forth.

2. The herein-described method of overcoming the sticking of skelp or tubing in the manufacture of wrought-metal tubing, consisting in imparting a longitudinal jar to the rod supporting the ball or mandrel, substantially as and for the purposes set forth.

3. In apparatus for the manufacture of wrought-metal tubing, the combination, with the snubbing-post and rod supporting the welding ball or mandrel, of the pin in the snubbing-post apparatus acting to sustain the rod against back-pressure and adapted to be drawn out of line with the rod, substantially as and for the purposes set forth.

4. In apparatus for the manufacture of wrought-metal tubing, the combination, with the rod supporting the welding ball or mandrel and the snubbing-post lever having the stop-plate $m$, of the pin $r$ on the stop-plate in line with the supporting-rod and adapted to be drawn out of the course thereof, substantially as and for the purposes set forth.

In testimony whereof I, the said HIRAM C. BRADEEN, have hereunto set my hand.

HIRAM C. BRADEEN.

Witnesses:
  W. C. SOLES,
  JAMES B. MURRAY.